United States Patent
Dudarenke et al.

(10) Patent No.: US 8,725,328 B1
(45) Date of Patent: May 13, 2014

(54) METHODS AND SYSTEMS FOR MONITORING MARINE ENGINE COOLING WATER PUMPS

(71) Applicant: Brunswick Corporation, Lake Forest, IL (US)

(72) Inventors: Jeffrey J. Dudarenke, Fond du Lac, WI (US); Ronnie E. Randolph, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 64 days.

(21) Appl. No.: 13/655,207

(22) Filed: Oct. 18, 2012

(51) Int. Cl.
*G05D 1/00* (2006.01)
*B63B 49/00* (2006.01)

(52) U.S. Cl.
CPC ................................. *B63B 49/00* (2013.01)
USPC .................................................... 701/21

(58) Field of Classification Search
CPC ........................... B63B 2770/00; B63B 49/00
USPC ........................................................ 701/21
See application file for complete search history.

(56) References Cited

U.S. PATENT DOCUMENTS

| | | | |
|---|---|---|---|
| 4,392,779 A | 7/1983 | Bloemers et al. | |
| 4,897,059 A | 1/1990 | Newman | |
| 5,330,376 A * | 7/1994 | Okumura | 440/88 R |
| 6,454,621 B2 * | 9/2002 | Matsuda | 440/88 R |
| 6,478,643 B2 * | 11/2002 | Jolley | 440/88 R |
| 6,500,038 B1 * | 12/2002 | Jaeger et al. | 440/88 R |
| 6,506,085 B1 * | 1/2003 | Casey et al. | 440/88 N |
| 6,577,932 B1 * | 6/2003 | Van Beurden et al. | 701/21 |
| 6,695,660 B1 * | 2/2004 | Ellis | 440/88 C |
| 6,827,048 B2 * | 12/2004 | Kinomoto et al. | 123/41.14 |
| 7,114,469 B1 | 10/2006 | Taylor | |
| 7,497,751 B1 * | 3/2009 | White | 440/88 P |
| 7,874,884 B1 * | 1/2011 | White et al. | 440/88 R |

* cited by examiner

*Primary Examiner* — Mary Cheung
*Assistant Examiner* — Frederick Brushaber
(74) *Attorney, Agent, or Firm* — Andrus Intellectual Property Law, LLP

(57) ABSTRACT

Systems and methods are for monitoring an operational characteristic of a pump pumping cooling water from upstream to downstream to cool a marine engine. A sensor senses a characteristic of the cooling water at a location that is downstream of the pump. A control circuit is in communication with the sensor and receives the sensed characteristic of the cooling water, compares the sensed characteristic of the cooling water to a stored nominal value, and determines a present operational condition of the pump based on the comparison.

18 Claims, 7 Drawing Sheets

| 1 | 2 | 3 | 4 | 5 |
|---|---|---|---|---|
| Engine Speed (s) (RPM) | Nominal Pressure (N) (KPa) | Minimum Pressure (M) (KPa) | Sensed Pressure (P) (KPa) | Pump Operational Efficiency (%) |
| 650 (idle) | 23 | 10 | 22.74 | 98 |
| 1000 | 29 | 23 | 28.52 | 92 |
| 1500 | 40 | 28 | 39.40 | 95 |
| 2000 | 54 | 36 | 53.28 | 96 |
| 2500 | 67 | 44 | 67 | 100 |
| 3000 | 90 | 51 | 88.44 | 96 |
| 3500 | 110 | 57 | 108.41 | 97 |
| 4000 | 134 | 63 | 132.58 | 98 |
| 4500 | 146 | 69 | 146 | 100 |
| 5000 | 154 | 74 | 154 | 100 |
| 5500 | 160 | 78 | 160 | 100 |
| 6000 | 166 | 83 | 166 | 100 |

Fig. 3

METHODS AND SYSTEMS FOR MONITORING MARINE ENGINE COOLING WATER PUMPS

FIELD

The present disclosure relates to methods and systems for monitoring pumps that pump cooling water from upstream to downstream to cool a marine engine.

BACKGROUND

U.S. Pat. No. 4,392,779, which is incorporated herein by reference, discloses marine drives having water-cooled engines that utilize a water pump mounted over the drive shaft and internal to the drive shaft housing to provide engine cooling, the pump having stamped metal housing parts and a flexible impeller.

U.S. Pat. No. 4,897,059, which is incorporated herein by reference, discloses a corrosion resistant coolant pump for placement in the cooling system of a marine drive. The pump includes a corrosion resistant member mounted to and rotatable with a drive shaft interconnected with and rotatable in response to the engine crankshaft. The corrosion resistant member is preferably a cup adapted for receiving and enclosing an end of the drive shaft, with a portion of the cup extending into a cavity formed in the coolant pump housing. The cavity is in communication with marine drive cooling system. An impeller is connected to the cup and housed within the cavity for pumping coolant through the system.

U.S. Pat. No. 7,114,469, which is incorporated herein by reference, discloses a cooling system for a marine engine which divides a flow of cooling water into first and second streams downstream of a pump. The first stream flows through a first cooling system which is controlled by a pressure sensitive valve. The second stream flows through a second cooling system which is controlled by a temperature-sensitive valve.

U.S. patent application Ser. No. 12/944,454, which is incorporated herein by reference, discloses systems and methods conceived by the present inventor for cooling marine engines. In one example, a cooling system for a marine engine comprises an elongated exhaust conduit comprising a first end receiving hot exhaust gas from the marine engine and a second end discharging the exhaust gas. An elongated cooling water jacket extends adjacent to the exhaust conduit. The cooling water jacket receives raw cooling water at a location proximate to the second end of the exhaust conduit, conveys the raw cooling water adjacent to the exhaust conduit to thereby cool the exhaust conduit and warm the cooling water, and thereafter discharges the cooling water to cool the marine engine.

SUMMARY

This summary is provided to introduce a selection of concepts that are further described herein below in the detailed description. This summary is not intended to identify key or essential features of the claimed subject matter, nor is it intended to be used as an aid in limiting the scope of the claimed subject matter.

The present disclosure arose during continued research and development of methods and systems for monitoring pumps that pump cooling water from upstream to downstream to cool a marine engine.

In one example, a monitoring system for a pump pumping cooling water from upstream to downstream to cool the marine engine comprises a sensor sensing a characteristic of the cooling water at a location that is downstream of the pump and a control circuit in communication with the sensor. The control circuit is configured to receive the sensed characteristic of the cooling water, compare the sensed characteristic of the cooling water to a stored nominal value, and determine a present operational condition of the pump based on the comparison. The control circuit can be further configured to compare the sensed characteristic to a stored minimum value and determine the present operational condition of the pump based on the comparisons to both of the stored nominal value and the stored minimum value. The control circuit can be further configured to interpolate a percent operational efficiency of the pump based on the comparisons to the stored nominal value and stored minimum value.

In another example, a method of monitoring an operational characteristic of a pump pumping cooling water from upstream to downstream to cool a marine engine comprises (1) sensing with a sensor a characteristic of the cooling water at a location that is downstream of the pump; (2) comparing with a control circuit the sensed characteristic of the cooling water to a stored nominal value; and (3) determining with the control circuit a present operational condition of the pump based on the comparison. The method can further comprise comparing with the control circuit the sensed characteristic to a stored minimum value and determining with the control circuit the present operational condition of the pump based on the comparisons to both of the stored nominal value and the stored minimum value. The method can further comprise interpolating with the control circuit a percent operational efficiency of the pump based on the comparisons to the stored nominal value and stored minimum value.

BRIEF DESCRIPTION OF THE DRAWINGS

Examples of methods and systems for monitoring marine engine cooling water pumps are described with reference to the following drawing figures. The same numbers are used throughout the figures to reference like features and components.

FIG. 3 is a table showing calculated percent operational efficiency.

DETAILED DESCRIPTION OF THE DRAWINGS

In the present description, certain terms have been used for brevity, clearness and understanding. No unnecessary limitations are to be implied therefrom beyond the requirement of the prior art because such terms are used for descriptive purposes only and are intended to be broadly construed. The different apparatuses described herein may be used alone or in combination with other apparatuses. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
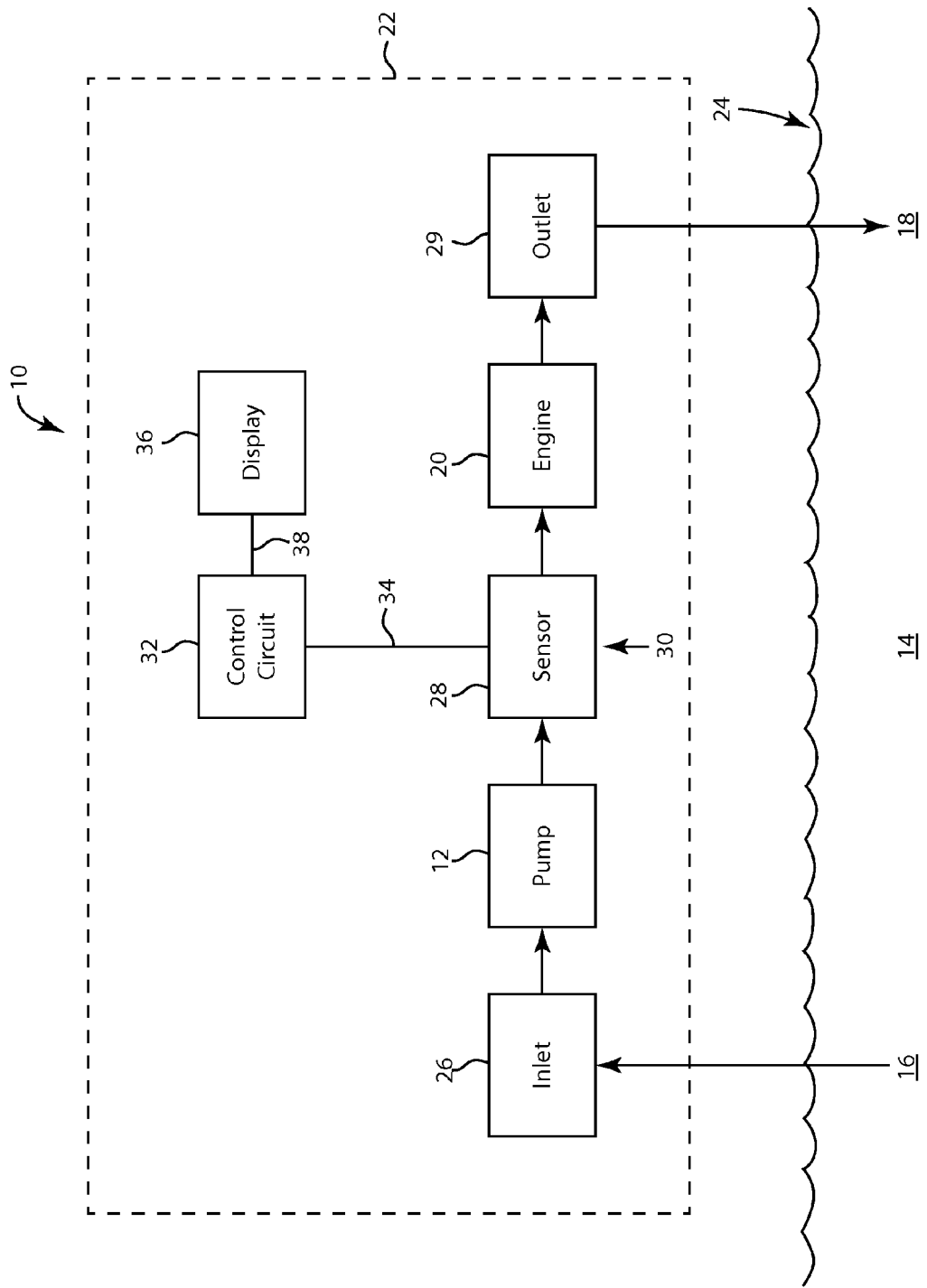
FIG. 1 is a schematic depiction of a system for monitoring a pump that pumps cooling water to cool a marine engine.

FIG. 1 depicts a monitoring system 10 for monitoring a present operational condition of a pump 12 that pumps cooling water 14 from upstream 16 to downstream 18 to cool an engine 20 in a marine propulsion system 22. The marine engine 20 can be an internal combustion engine. The marine propulsion system 22 can be any type of apparatus for propelling a marine vessel, such as one or more of an outboard motor, inboard motor, stern drive, pod drive(s), and/or the like. The type of engine 20 and marine propulsion system 22 can vary from that which is shown and described and is not essential to the concepts of the present disclosure.

The pump 12 can comprise an impeller pump and/or the like for withdrawing cooling water 14 from the body of water 24 in which the marine propulsion system 22 is operating and pumping cooling water 14 for cooling components of the marine propulsion system 22. However the pump 12 does not have to be an impeller pump; that is, the type of pump can vary from that which is shown and described and is not essential to the concepts of the present disclosure. Cooling water 14 is drawn by the pump 12 through one or more inlets 26 and pumped for cooling purposes through various components of the marine propulsion system 22 including the noted engine 20. The cooling water 14 is discharged from the marine propulsion system 22 and back to the body of water 24 via one or more outlets 29.

One or more sensors 28 sense one or more characteristics of the cooling water 14 at a location 30 that is downstream of the pump 12. In one example, the sensor 28 is a transducer for sensing pressure of the cooling water 14. Temperature rise across non dynamic components with a consistent and known heat rejection could be used as an indirect measurement, as well as flow rate could be used as a direct measurement. In these alternate embodiments, other types of sensors can be employed, such as temperature sensors, flow meters and/or the like. The type of sensor can vary from that which is shown and described; that is other types of sensors can be utilized to sense other characteristics of the cooling water 14. The type and number of sensors 28 can vary from that which is shown and described.

A control circuit 32 is in communication with the sensor 28 via a communication link 34. In the example shown, the control circuit 32 includes a computer area network (CAN). The control circuit 32 can have one or more command control section(s) and one or more control sections exchanging information and/or commands with the command control section(s). The control circuit 32 has computer readable medium and executable code and a memory for storing data. As discussed further herein below, the control circuit 32 is specially configured to send and receive control signals and execute code to perform functions. The communication link 34 can be wired or wireless and facilitates transfer of information from the sensor 28 to the control circuit 32. The type of control circuit 32 can vary from that which is shown and described. Other examples of a control circuit 32 can embody a non-CAN-based network that functions based upon discrete analog inputs.

The control circuit 32 communicates with a display 36 via a wired or wireless link 38. The display 36 can include a video monitor, a light, or any other device for visually indicating a condition of the pump 12 to the operator. More than one display 36 can be provided. The type and location of the display 36 can vary. In addition to or instead of a display 36, an audio device or any other indicator can be provided for providing indication to the operator regarding the operational condition of the pump 12.

Through research and development, the present inventors realize that cooling water pumps are subject to wear and breakdown which can negatively impact the efficiency of the pump and its ability to effectively cool components of the marine propulsion system, such as the engine. Historically, wear and breakdown of cooling water pumps has been addressed reactively upon an operational failure of the pump during use. In many instances, cooling water pumps are periodically inspected in anticipation of such breakdown. Cooling water pumps are often replaced unnecessarily to avoid undesirable consequences when such failures occur. This can be inefficient and wasteful. Through research and development, the present inventors have realized that more proactive systems and methods to provide feedback to the owner/operator as to the operational efficiency and/or remaining life of the pump would be beneficial and allow for a more efficient scheduling of maintenance and/or replacement of the pump. The present inventors have also realized that characteristics of the cooling water downstream of the pump, such as pressure, are indicative of volume flow rate required to cool the engine, and further that a reduced pressure associated with the noted wear and/or degradation of the pump can result in lower volume flow rate and potentially an engine overheat, negatively limiting functionality of the engine. The inventors have recognized that by actively observing the output pressure of the pump and comparing the output pressure to one or more threshold values, such as the nominal and minimal values described herein blow, a real-time amount of pump degradation can be proactively identified and optionally conveyed to the operator of the system.

Figure 2:
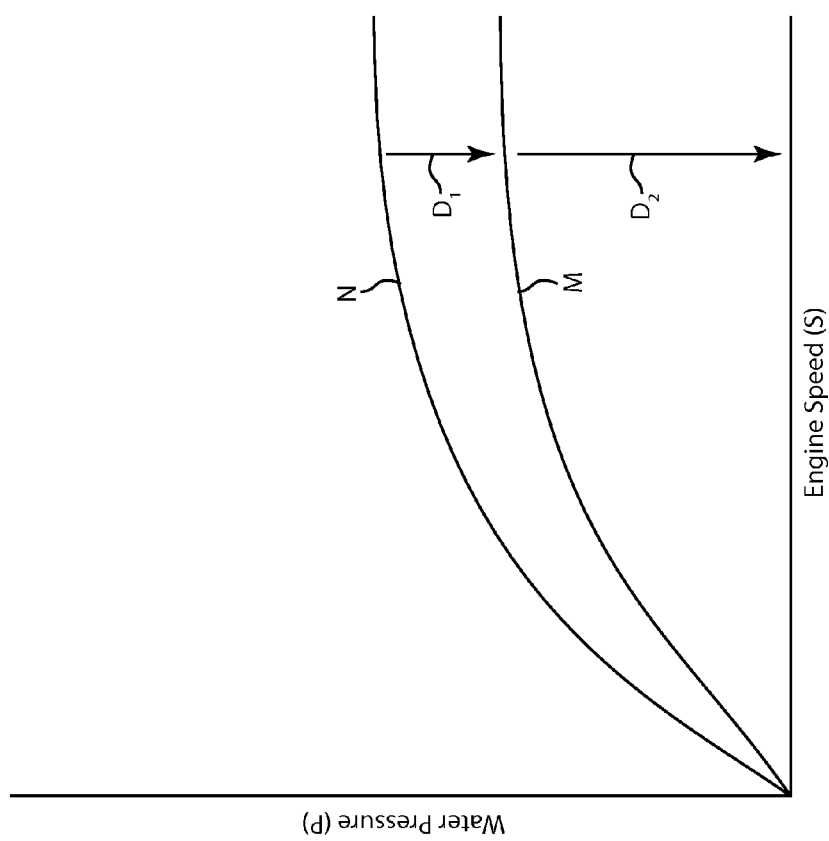
FIG. 2 is a flow chart depicting water pressure downstream of the pump versus engine speed.

FIG. 2 is a flow chart plotting cooling water pressure P downstream of the pump (see the y-axis) versus engine speed S (see the x-axis). The present inventors have realized that for each particular marine propulsion system 22, during set-up of the system 22, it is possible to calibrate and store in the memory of the control circuit 32 a series of nominal values N, each of which correspond to an expected cooling water pressure P at the location 30 at a corresponding speed S of the engine 20 if the pump 12 is operating at one hundred percent of expected operational efficiency. It is further possible to calibrate and store in the memory of the control circuit 32 a series of minimum values M, each of which correspond to an expected cooling water pressure P at the location 30 at a corresponding speed S of the engine 20 if the pump 12 is operating at its minimum allowable operational efficiency necessary to achieve acceptable minimum allowable cooling function in the marine propulsion system 22. Thereafter, during operation of the marine propulsion system 22, degradation of the pump 12 will cause the cooling water pressure P at the location 30 to drop below the nominal value N (e.g. as shown at line $D_1$ at speed S) and potentially to drop below the minimum value M (e.g. at shown at $D_2$ at speed S). Thus, by sensing pressure P of the cooling water 14 at the location 30, the actual real time operating efficiency (i.e. amount of degradation) can be determined and effectively conveyed to the operator in real time.

As discussed further herein below, any negative difference between the actual cooling water pressure P sensed by the sensor 28 at the location 30 and the calibrated nominal value N is indicative of an amount of degradation of the pump 12. Such negative difference optionally can be interpolated by the control circuit 32 into a percentage of one hundred percent efficiency and optionally displayed to the operator of the marine propulsion system 22. Further, any negative difference between the actual cooling water pressure P sensed by the sensor 28 and the minimum value M is indicative of an unacceptable amount of degradation or an actual failure of the pump 12, which also can be displayed to the operator of the marine propulsion system 22. The control circuit 32 can thus be configured to receive the characteristic of the cooling water 14 sensed by sensor 28, which in this example is pressure P of the cooling water 14, compare the sensed characteristic of the cooling water 14 to a stored nominal value N, and thereby determine a present operational condition of the pump 12, which in this example is interpolated and presented as a percent operational efficiency of the pump 12. The control circuit 32 can further be configured to compare the sensed characteristic to a stored minimum value M, which in this example is a minimum allowable cooling water pressure, and determine the present operational condition, and optionally the percent operational efficiency of the pump 12 based on the comparisons to both of the stored nominal value N and the stored minimum value M.

FIG. 3 is a table having five columns including column one listing a plurality of engine speeds, column two listing a stored plurality of engine-speed-specific nominal pressure values N, column three listing a stored plurality of engine-speed-specific minimum pressure values M, column four listing a plurality of sensed pressure values P at the plurality of engine speeds S, and column five listing an array of engine-speed-specific percent operational efficiencies of the engine. As mentioned above, the pluralities of engine-speed-specific nominal pressure values N and engine-speed-specific minimum pressure values M are calibrated during set-up of the marine propulsion system 22. During operation of the pump 12, the sensor 28 is configured to sense the pressure P at each of the noted plurality of engine speeds S listed in column one. The control circuit 32 is configured to compare the sensed pressure P to the stored nominal pressure value N and stored minimum pressure value M and determine the percent operational efficiency of the pump 12 based on the comparisons. For example, at the engine speed 2000 RPM, the stored nominal pressure value N is calibrated to 54 kPa and the stored minimum pressure M value is calibrated to 36 kPa. In this example, the sensor 28 senses a cooling water pressure P of 53.28 kPa. Thus, the control circuit 32 is configured to calculate the percent operational efficiency at 2000 RPM according to the following equation:

$$(P-M)/(N-M)*100 = \% \text{ Operational Efficiency}$$

During operation, the sensor 28 senses the pressure of the cooling water 14 at each of the plurality of engine speeds and the control circuit 32 compares each of the sensed pressures P at the engine speeds S to the corresponding stored nominal pressure value N and stored minimum pressure value M. The control circuit 32 can also be configured to determine that the pump 12 should be at least one of replaced and repaired when at least one of the percent operational efficiencies shown in column five is less than a stored threshold percent operational efficiency, such as for example ten percent. The threshold percent operational efficiency can be saved in the memory of the control circuit 32 and does not have to be 10% and can be selected at calibration of the system 22.

FIGS. 4-7 illustrate exemplary embodiments of methods for monitoring marine engine cooling water pumps using the systems described herein above and depicted in FIG. 1. FIGS. 4-7 reference a "characteristic of cooling water", which as described above can be the pressure of cooling water at location 30. Characteristics other than pressure can be utilized within the scope of the present disclosure.

Figure 4:
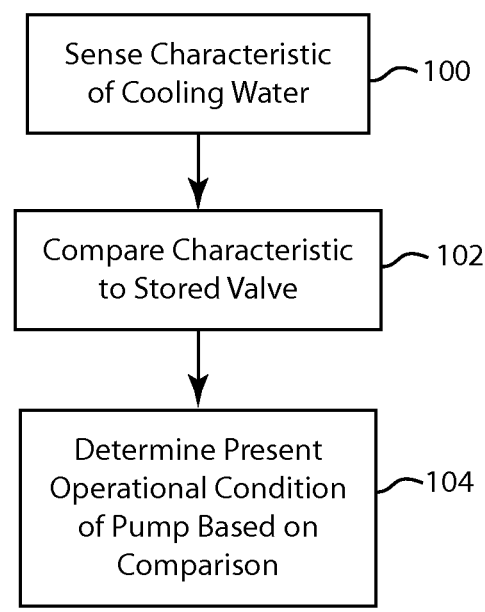
FIG. 4 a flow chart showing on example of a method for monitoring a pump that pumps cooling water to cool a marine engine.

In FIG. 4, at step 100, a characteristic of the cooling water 14 is sensed by the sensor 28 at the location 30 that is downstream of the pump 12. At step 102, the control circuit 32 compares the sensed characteristic of the cooling water 14 to a stored value, which for example can be the nominal value N and/or the minimum value M described herein above. At step 104, the control circuit 32 determines a present operational condition of the pump 12 based on the comparison. The present operational condition of the pump 12 can, for example, be interpolated into the percent operational efficiency described herein above.

Figure 5:
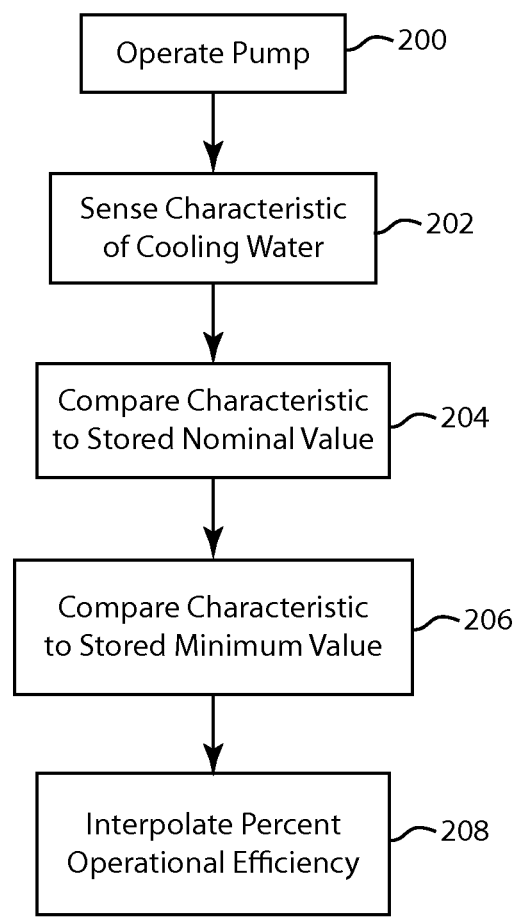
FIG. 5 is a flow chart showing another example of a method for monitoring a pump that pumps cooling water to cool a marine engine.

In FIG. 5, at step 200, the pump 12 is operated. At step 202, the sensor 28 senses a characteristic of the cooling water 14 at a location that is downstream of the pump 12. At step 204, the control circuit 32 compares the sensed characteristic of the cooling water 14 to a stored nominal value N. At step 206, the control circuit 32 compares the sensed characteristic of the cooling water 14 to a stored minimum value M. At step 208, the control circuit 32 determines a present operational condition of the pump 12 by interpolating a percent operational efficiency based on the comparison.

Figure 6:
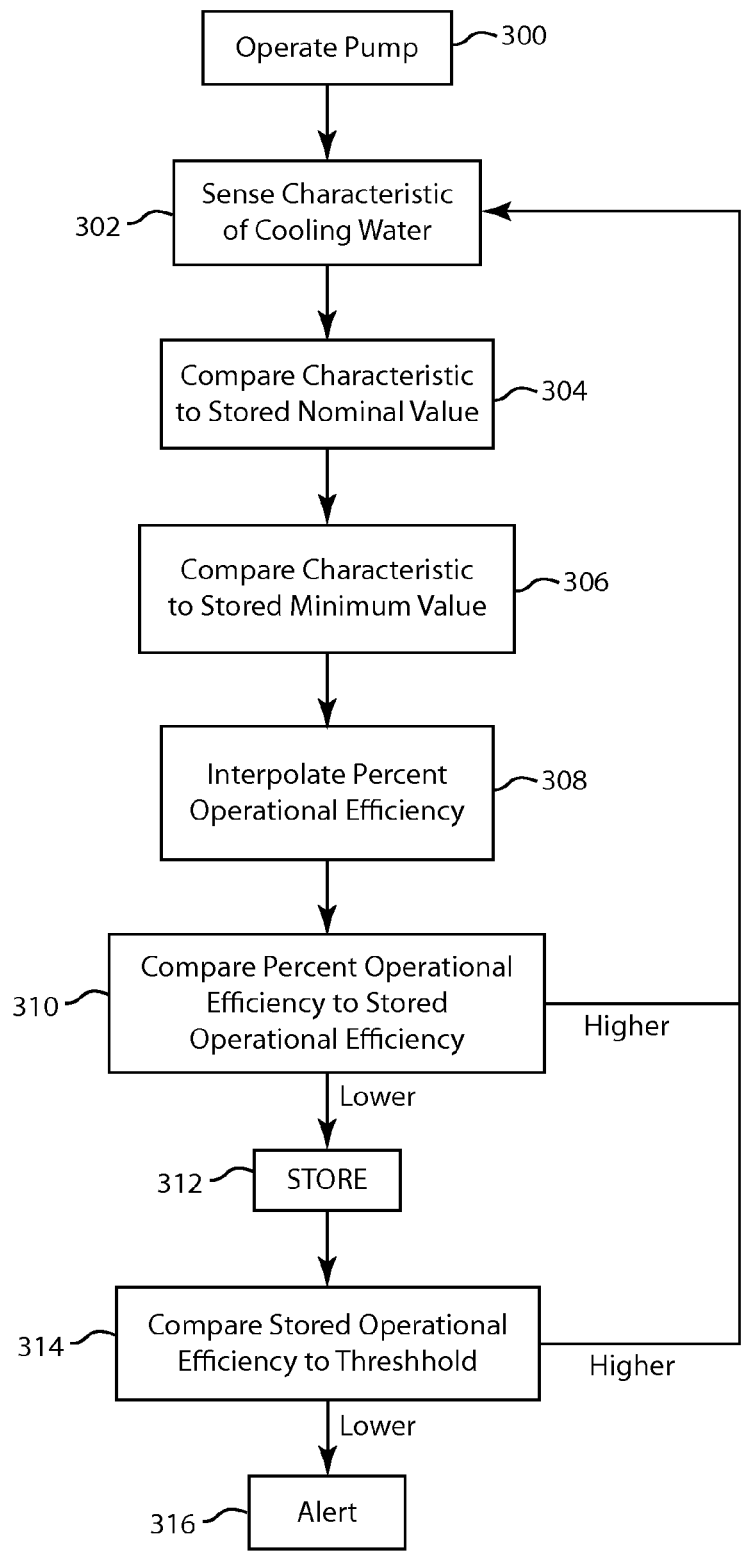
FIG. 6 is a flow chart showing another example of a method for monitoring a pump that pumps cooling water to cool a marine engine.

In FIG. 6, at step 300, the pump 12 is operated. At step 302, the sensor 28 senses a characteristic of the cooling water 14 at location 30 downstream of the pump 12. At step 304, the control circuit 32 compares the sensed characteristic of the cooling water 14 to a stored nominal value N. At step 306, the control circuit 32 compares the sensed characteristic of the cooling water 14 to a stored minimum value M. At step 308, the control circuit 32 interpolates a percent operational efficiency of the pump 12. At step 310, the control circuit compares the percent operational efficiency to an operational efficiency that is stored in the memory of the control circuit 32. If the newly calculated percent operational efficiency is higher than the stored operational efficiency, the method returns to step 302. If the new percent operational efficiency is lower than the stored operational efficiency, at step 312, the control circuit 32 stores the new percent operational efficiency. At step 314, the control circuit 32 compares the stored operational efficiency to a threshold that is stored in the memory of the control circuit 32. If the stored operational efficiency is higher than the threshold, the method returns to step 302. If the stored operational efficiency is lower than the threshold, at step 316, the control circuit 32 operates the display 36 to provide an alert to the operator.

Figure 7:
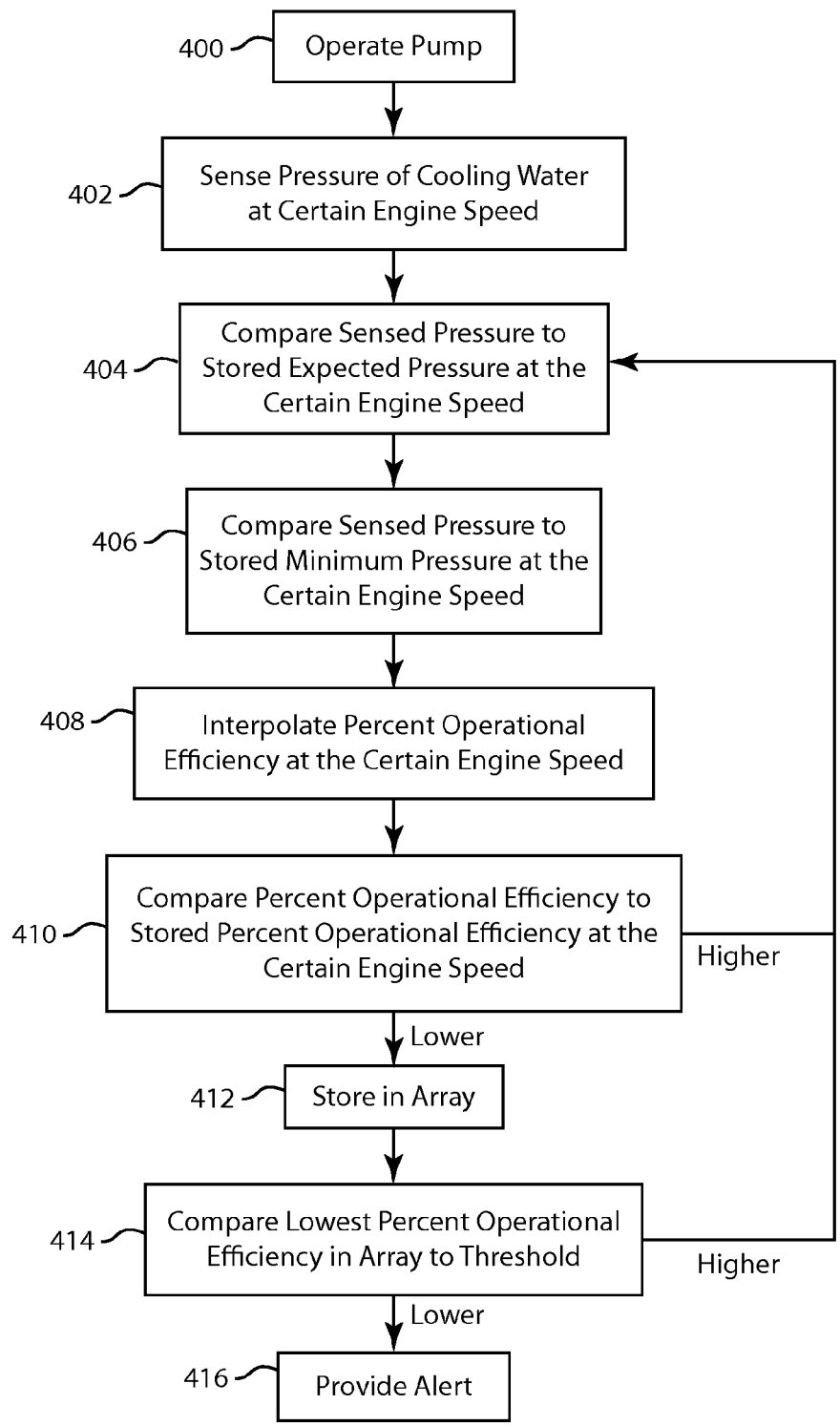
FIG. 7 is a flow chart showing another example of a method for monitoring a pump that pumps cooling water to cool a marine engine.

In FIG. 7, at step 400, pump 12 is operated. At step 402, the sensor 28 senses pressure of the cooling water 14 at a certain engine speed S. At step 404, the control circuit 32 compares the sensed pressure to a stored expected pressure (e.g. nominal pressure value N) at the certain engine speed S. At step 406, the control circuit 32 compares the sensed pressure to a stored minimum pressure (e.g. minimum pressure value M) at the certain engine speed S. At step 408, the control circuit 32 interpolates a percent operational efficiency at the certain engine speed S. At step 410, the control circuit 32 compares the percent operational efficiency to a stored percent operational efficiency at the certain engine speed S. If the new percent operational efficiency is higher than the stored percent operational efficiency, the method returns to step 402. If the new percent operational efficiency is less than the stored percent operational efficiency at the certain engine speed, at step 412, the control circuit 32 stores the new percent operational efficiency in an array. At step 414, the control circuit 32 compares the lowest percent operational efficiency in the array to a stored threshold. If the lowest percent operational efficiency in the array is higher than the threshold, the method returns to step 402. If the lowest percent operational efficiency is lower than the threshold, at step 416, the control circuit 32 operates the display 36 to provide an alert to the operator.

What is claimed is:

1. A monitoring system for a pump pumping cooling water from upstream to downstream to cool the marine engine, the monitoring system comprising:
    a sensor sensing a characteristic of the cooling water at a location that is downstream of the pump;
    a control circuit in communication with the sensor, the control circuit being configured to receive the sensed characteristic of the cooling water, compare the sensed characteristic of the cooling water to a stored nominal value, and determine a present operational condition of the pump based on the comparison;
    wherein the control circuit is further configured to compare the sensed characteristic to a stored minimum value and determine the present operational condition of the pump based on the comparisons to both of the stored nominal value and the stored minimum value; and
    wherein the control circuit is further configured to interpolate a percent operational efficiency of the pump based on the comparisons to the stored nominal value and stored minimum value.

2. The monitoring system according to claim 1, wherein the control circuit is further configured to determine that the pump should be at least one of replaced and repaired when the percent operational efficiency of the pump is less than a stored threshold percent operational efficiency.

3. The monitoring system according to claim 2, wherein the sensor further senses the characteristic of the cooling water at each of a plurality of engine speeds and wherein the control circuit is further configured to compare each of the sensed characteristics at the plurality of engine speeds to one of a stored plurality of engine-speed-specific nominal values and one of a stored plurality of engine-speed-specific minimum values.

4. The monitoring system according to claim 3, wherein the control circuit is further configured to provide an array of engine-speed-specific percent operational efficiencies based on the comparisons of each of the sensed characteristics of the cooling water at the plurality of engine speeds to one of the plurality of engine-speed-specific nominal values and one of the plurality of engine-speed specific minimum values and to determine the present operational condition of the pump based on the comparisons.

5. The monitoring system according to claim 4, wherein the control circuit is configured to determine that the pump should be at least one of replaced and repaired when at least one of the percent operational efficiencies in the array is less than a stored threshold percent operational efficiency.

6. The monitoring system according to claim 1, comprising a display, wherein the control circuit is configured to display the present operational condition of the pump on the display.

7. A monitoring system for a pump pumping cooling water from upstream to downstream to cool the marine engine, the monitoring system comprising:
    a sensor sensing a characteristic of the cooling water at a location that is downstream of the pump;
    a control circuit in communication with the sensor, the control circuit being configured to receive the sensed characteristic of the cooling water, compare the sensed characteristic of the cooling water to a stored nominal value, and determine a present operational condition of the pump based on the comparison; and
    wherein the characteristic of the cooling water is a pressure of the cooling water at a predetermined engine speed.

8. The monitoring system according to claim 7, wherein the stored nominal value is an expected pressure of the cooling water at the predetermined engine speed when the pump is efficiently operating.

9. The monitoring system according to claim 8, wherein the stored minimum value is an expected pressure of the cooling water at the predetermined engine speed when the pump is in need of at least one of replacement and repair.

10. A method of monitoring an operational characteristic of a pump pumping cooling water from upstream to downstream to cool a marine engine, the method comprising:
    sensing with a sensor a characteristic of the cooling water at a location that is downstream of the pump;
    comparing with a control circuit the sensed characteristic of the cooling water to a stored nominal value;
    determining with the control circuit a present operational condition of the pump based on the comparison; and
    comprising interpolating with the control circuit a percent operational efficiency of the pump based on the comparisons to the stored nominal value and stored minimum value.

11. The method according to claim 10, comprising determining with the control circuit that the pump should be at least one of replaced and repaired when the percent operational efficiency of the pump is less than a stored minimum percent operational efficiency.

12. The method according to claim 11, comprising sensing with a sensor the characteristic of the cooling water at each of a plurality of engine speeds and comprising comparing with the control circuit each of the sensed characteristics at the plurality of engine speeds to one of a stored plurality of engine-speed-specific nominal values and one of a stored plurality of engine-speed-specific minimum values.

13. The method according to claim 12, comprising providing with the control circuit an array of engine-speed-specific percent operational efficiencies based on the comparisons of each of the sensed characteristics of the cooling water at the plurality of engine speeds to one of the plurality of engine-speed-specific nominal values and one of the plurality of engine-speed specific minimum values and determining with the control circuit the present operational condition of the pump based on the comparisons.

14. The method according to claim 13, comprising determining with the control circuit that the pump should be at least one of replaced and repaired when at least one of the percent operational efficiencies in the array is less than a stored minimum threshold operational efficiency.

15. The method according to claim 10, comprising displaying the present operational condition of the pump on a display.

16. A method of monitoring an operational characteristic of a pump pumping cooling water from upstream to downstream to cool a marine engine, the method comprising:
    sensing with a sensor a characteristic of the cooling water at a location that is downstream of the pump;
    comparing with a control circuit the sensed characteristic of the cooling water to a stored nominal value;
    determining with the control circuit a present operational condition of the pump based on the comparison; and
    wherein the characteristic of the cooling water is a pressure of the cooling water at a predetermined engine speed.

17. The method according to claim 16, wherein the stored nominal value is an expected pressure of the cooling water at the predetermined engine speed when the pump is efficiently operating.

18. The method according to claim 17, wherein the stored minimum value is an expected pressure of the cooling water at the predetermined engine speed when the pump is in need of at least one of replacement and repair.

* * * * *